L. L. RUDRUD.
TREADLE GUARD FOR SPRING JAW TRAPS.
APPLICATION FILED DEC. 9, 1912.
1,074,210.
Patented Sept. 30, 1913.
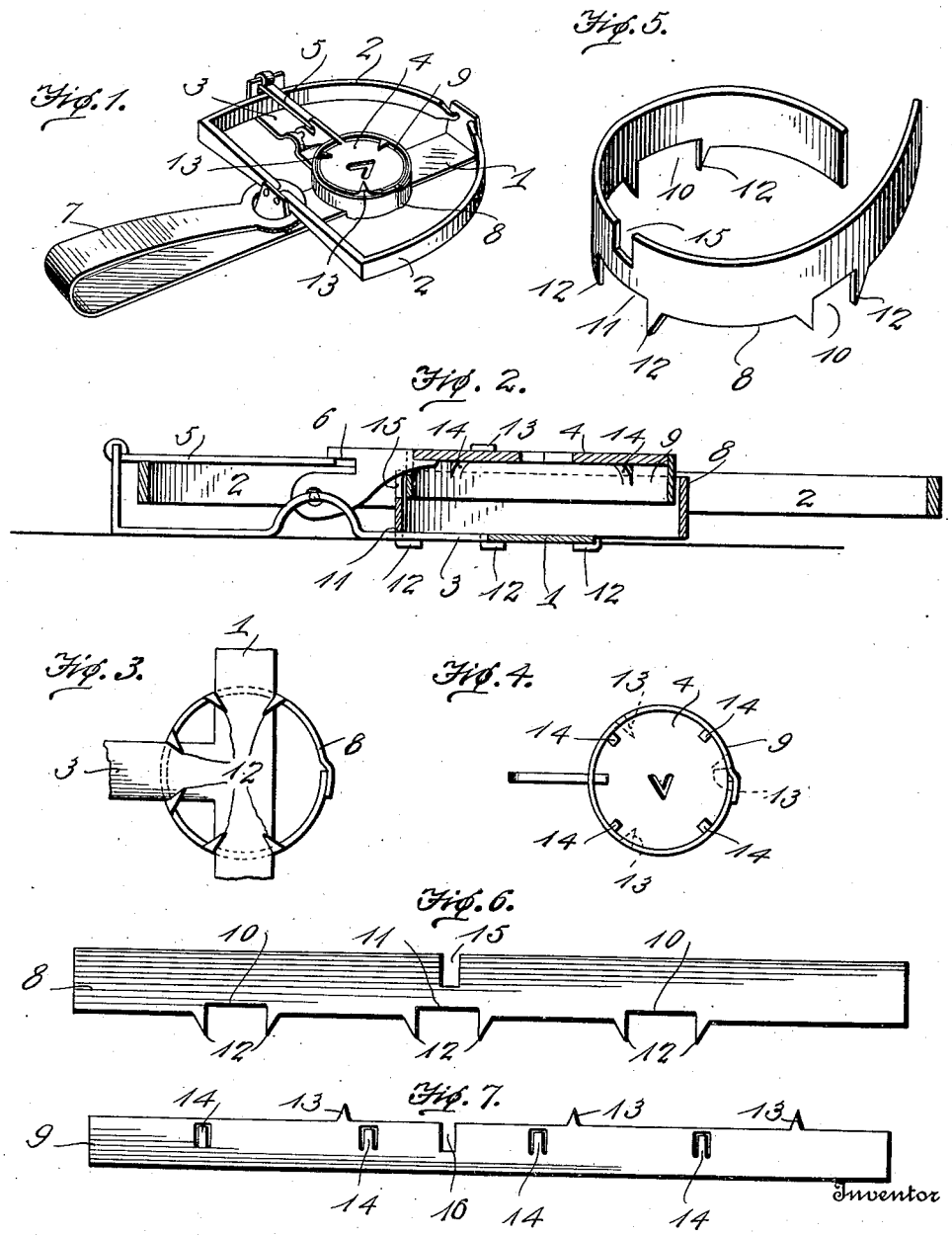
Witnesses
J. R. Pierce
C. E. Hunt
Inventor
L. L. Rudrud
By H. B. Willson & Co.
Attorneys

UNITED STATES PATENT OFFICE.

LOUIS L. RUDRUD, OF CRARY, NORTH DAKOTA.

TREADLE-GUARD FOR SPRING-JAW TRAPS.

1,074,210.  Specification of Letters Patent.  Patented Sept. 30, 1913.

Application filed December 9, 1912. Serial No. 735,820.

*To all whom it may concern:*

Be it known that I, LOUIS L. RUDRUD, a citizen of the United States, residing at Crary, in the county of Ramsey and State of North Dakota, have invented certain new and useful Improvements in Treadle-Guards for Spring-Jaw Traps; and I do declare the following to be a full, clear, and exact description of the invention, such as will enable others skilled in the art to which it appertains to make and use the same.

This invention relates to treadle guards for spring jaw traps.

One object of the invention is to provide a treadle guard for spring jaw traps whereby leaves, dirt, snow, or other foreign substances are prevented from getting beneath the bait pan or treadle and interfering with the springing of the trap.

Another object is to provide a guard of this character having an improved means for readily attaching the same to the frame and treadle or bait pan of the trap.

With these and other objects in view, the invention consists of certain novel features of construction, combination and arrangement of parts as will be more fully described and claimed.

In the accompanying drawings; Figure 1 is a perspective view of a trap showing the application of my improved treadle guard; Fig. 2 is a vertical sectional view thereof showing the parts in set position; Fig. 3 is a bottom plan view of a portion of the trap and guard; Fig. 4 is an inverted plan view of the bait pan or treadle and the treadle member of the guard; Fig. 5 is a detail perspective view of the frame member of the guard removed; Fig. 6 is a detail view of the blank from which the frame member of the guard is formed; Fig. 7 is a similar view of the blank from which the treadle member of the guard is formed.

Referring more particularly to the drawings 1 denotes the jaw supporting bar of the trap, to which are pivotally connected in the usual manner the jaws 2 and to which is secured the bait pan and catch supporting bar 3. To the bar 3 are pivotally connected the bait pan or treadle 4 and the jaw holding catch 5 which is engaged with a notch 6 in the shank of the treadle and holds the jaws open against the pressure of the jaw closing spring 7. These parts may be of the usual or any suitable construction and do not form part of my invention.

My improved guard comprises a frame member 8 and a telescoping treadle member 9. The frame member 8 is in the form of a ring or band of metal having a diameter slightly greater than the diameter of the treadle or bait pan 4. The lower edge of the guard member 8 is provided with notches 10 and 11 which are engaged respectively with the jaw supporting bar 1 and the treadle supporting bar 3. The member 8 is firmly secured to the bars 1 and 3 by gripping prongs 12 formed on the lower edges of the member at the ends of the notches 10 and 11 and which are bent into engagement with the under side of said bars 1 and 3 as clearly shown in Fig. 3 of the drawings.

The treadle member 9 comprises an annular band or ring having a diameter corresponding with the diameter of the treadle 4 with which it is engaged at its upper edge as shown. The member 9 is secured to the treadle or bait pan by prongs 13 formed on its upper edge and bent over into engagement with the upper side of the treadle, and by prongs 14 struck or cut from the ring or band and bent inwardly at their upper ends to form stops which engage the lower side of the treadle or bait pan. When thus arranged it will be seen that the treadle is firmly gripped between the prongs 13 and 14 which will firmly hold the member 9 in place.

The treadle member 9 is of slightly less diameter than the frame member 8 and loosely fits and works in the latter. The member 8 has formed therein a notch 15 and the member 9 has therein a corresponding notch 16, said notches registering with each other and being provided to receive a shank of the treadle or pan.

The rings or bands forming the members 8 and 9 of the guard are preferably cut or struck from strip metal as shown in Figs. 6 and 7 of the drawings, said strips being bent in circular form or other shape corresponding to the shape of the treadle or bait pan and having their ends soldered or otherwise fastened together to form the members. By providing a guard attachment such as herein shown and described it will be seen that the same may be readily applied to a spring jaw trap and will effectually prevent the clogging of the bait pan or treadle. The guard will permit the trap to be covered and hidden by leaves, dirt or other material without danger of such covering getting under the treadle and interfering with the springing of the trap.

From the foregoing description taken in connection with the accompanying drawings, the construction and operation of the invention will be readily understood without requiring a more extended explanation.

Having thus described my invention, what I claim is:

A treadle guard for attachment to spring jaw traps and comprising a frame in the form of a band of strip metal notched in its lower edge to fit the bars of the trap-frame, and provided in its upper edge with a single notch adapted to receive the treadle shank, and prongs formed on the lower edge of said band at opposite sides of the notches therein to be bent under and into engagement with said bars, substantially as described.

In testimony whereof I have hereunto set my hand in presence of two subscribing witnesses.

LOUIS L. RUDRUD.

Witnesses:
CLIFFORD BRADSHAW,
JAY A. MULLER.